No. 880,548. PATENTED MAR. 3, 1908.
B. LLOYD.
DUMPING CAR, WAGON, AND THE LIKE.
APPLICATION FILED SEPT. 10, 1907.
3 SHEETS—SHEET 1.
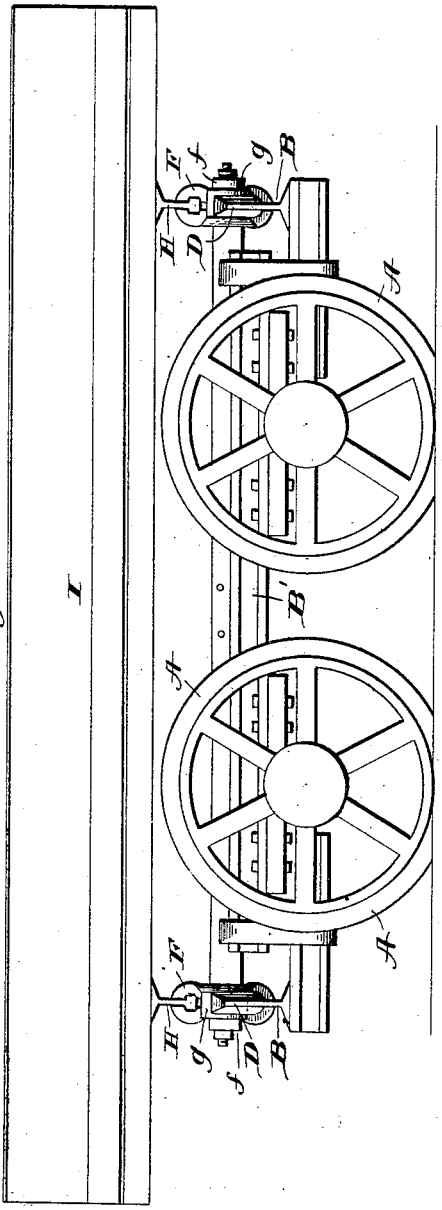
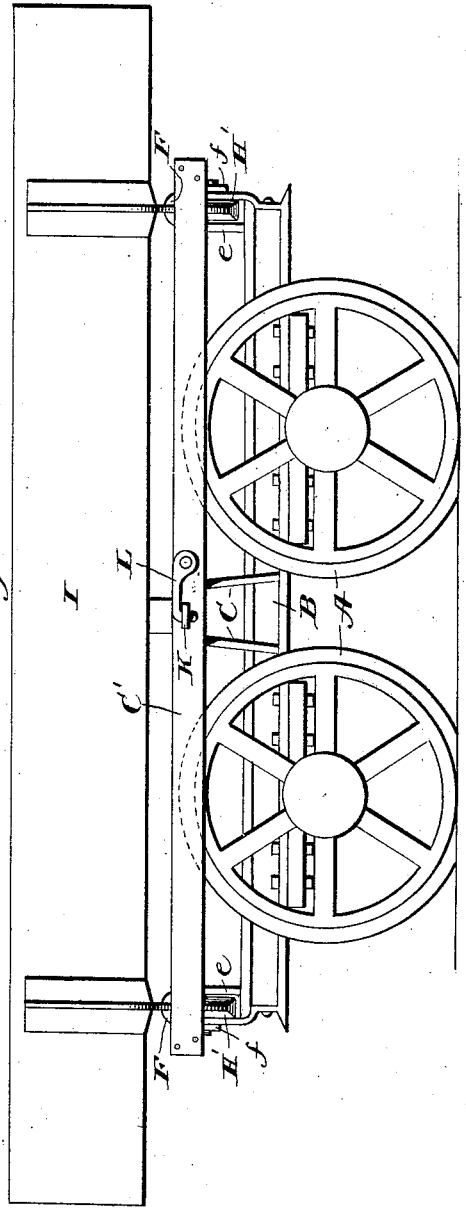
Witnesses.
Jas E Hutchinson
Calvin P. Fortune
Inventor:
Bert Lloyd,
By Ward Williams Attorneys

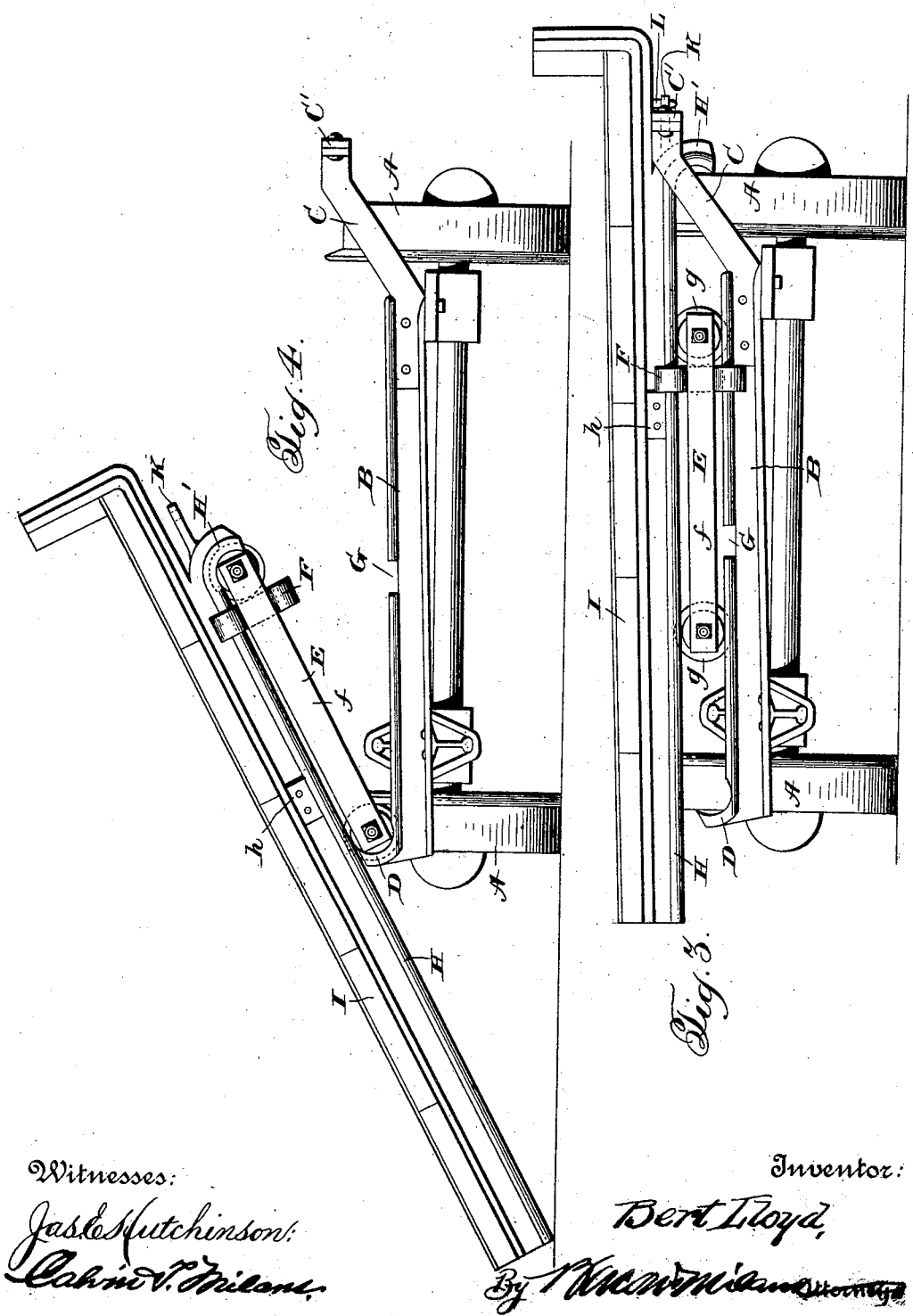

No. 880,548. PATENTED MAR. 3, 1908.
B. LLOYD.
DUMPING CAR, WAGON, AND THE LIKE.
APPLICATION FILED SEPT. 10, 1907.
3 SHEETS—SHEET 3.
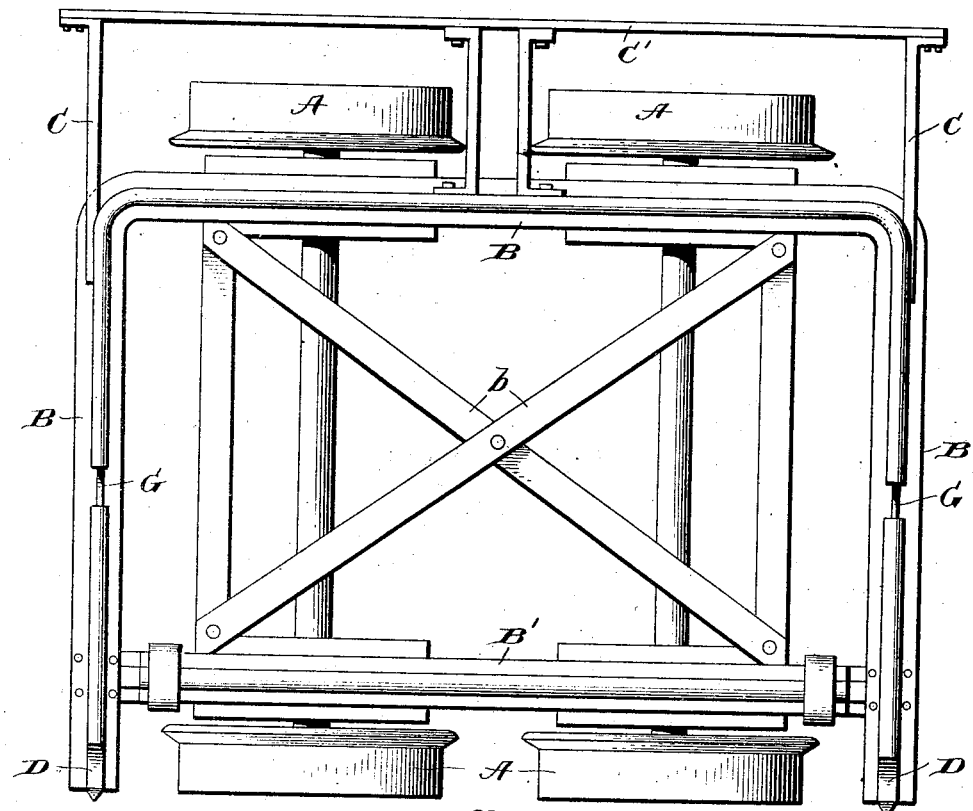
Fig. 5.
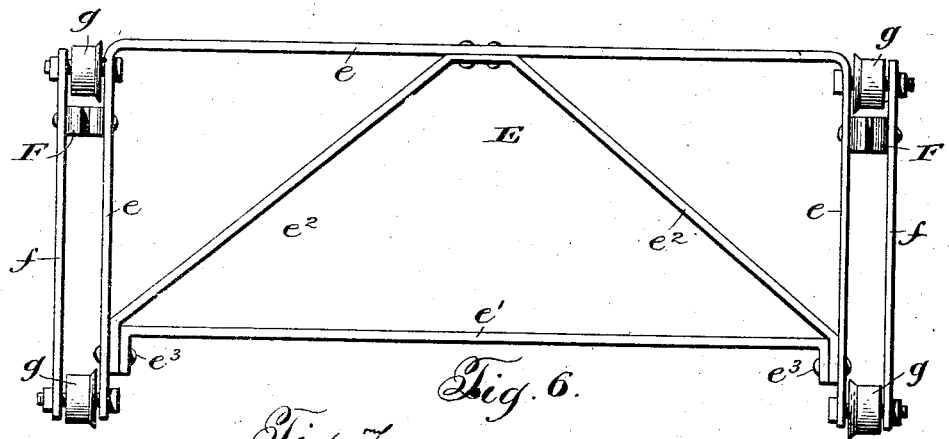
Fig. 6.
Fig. 7.
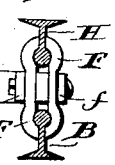
Witnesses: Jas E Hutchinson, Calvin T Milans
Inventor: Bert Lloyd
Attorneys

UNITED STATES PATENT OFFICE.

BERT LLOYD, OF COKEDALE, COLORADO, ASSIGNOR OF ONE-HALF TO FREDERICK P. BAYLES, OF COKEDALE, COLORADO.

DUMPING CAR, WAGON, AND THE LIKE.

No. 880,548.  Specification of Letters Patent.  Patented March 3, 1908.

Application filed September 10, 1907. Serial No. 392,236.

*To all whom it may concern:*

Be it known that I, BERT LLOYD, a citizen of the United States, residing at Cokedale, in the county of Las Animas and State of Colorado, have invented certain new and useful Improvements in Dumping Cars, Wagons, and the Like, of which the following is a specification, reference being had therein to the accompanying drawing.

This invention relates to dumping cars, wagons and the like and has particular reference to cars or wagons having mounted thereon a truck adapted for travel, and tilting movement relative to the main truck-frame.

The invention includes a novel means of support for the auxiliary truck together with means whereby the auxiliary truck is automatically released at one end to provide for its tilting.

The invention also comprises novel means whereby a suitable table or platform is supported upon the auxiliary truck for independent movement relative to the said truck and tilting movement therewith.

With the above and other objects in view, the invention while susceptible of a variety of different adaptations more particularly comprises an auxiliary truck mounted upon the main truck frame for movement sidewise of the frame and carrying with it a table or platform independently movable also sidewise of the main truck and adapted to tilt with the auxiliary truck relative to the main truck so as to dump the material to the side of the main truck.

Other novel features and details of construction will be more particularly pointed out in the description following, and readily understood when considered in connection with the accompanying drawings, forming a part hereof, and wherein a preferable embodiment of the invention is shown for the purpose of illustration:

In the said drawings: Figure 1 is a side view of a car, wagon or the like with the dumping apparatus mounted thereon. Fig. 2 is a view similar to Fig. 1 showing the reverse side. Fig. 3 is an end view disclosing the auxiliary truck and table in normal position. Fig. 4 is a similar view showing the auxiliary truck and table in tilted position for the purpose of dumping. Fig. 5 is a top plan view of the main truck with the auxiliary truck and table removed. Fig. 6 is a top plan view of the auxiliary truck. Fig. 7 is a detail view of a novel locking means for normally holding the auxiliary truck in position on the main truck.

Referring now more particularly to the drawings wherein like reference characters designate corresponding parts through the several views, A designates wheels or runners on which is mounted the frame or body of the main truck. This truck may conveniently be a car, wagon or the like, and the said main frame preferably comprises a substantially U-shaped member B and connecting member B', both of said members being of substantially T-shaped cross section. Extending forwardly and upwardly from the ends of said frame are suitable braces C arranged to support a longitudinally extending bar C'. Braces similar to those C may be provided intermediate the ends of said bar C'. The upper ends of the brace members C and the top of the bar C' constitute a support for one end of the table mounted upon the auxiliary truck about to be described. Brace arms or bars may be and preferably are provided for the main frame, the same being indicated by the character b, D represent oppositely disposed goose-neck portions at one side of the main frame, the same conveniently being integral extensions of the free ends of the U-shaped member B, and constitute means for limiting the movement of the auxiliary truck, as well as the fulcrum about which the truck tilts. The main frame or truck is supported upon the wheels A at an inclination as clearly shown in Figs. 3 and 4. The auxiliary truck, E when released from its normal position at the upper end of the inclined frame automatically moves by force of gravity downwardly until it contacts with the goose-neck portions D. The auxiliary truck, clearly shown in Fig. 6, is preferably composed of a substantially U-shaped bar e, a connecting bar e', and an angle bar e², the latter being secured at its bend to the base of the U-shaped bar e and having offset portions at its free ends corresponding with similar offset portions at the ends of the connecting bar e', whereby each of said bars e' and e² are connected at e³ to the free ends of the U-shaped bar e. Suitable bars f are provided extending parallel with the free ends of the U-shaped member e, between which bars f and said free ends of the member e, anti-friction bearings or rollers g are journaled. F designate clips secured between the bars f and e and adapted to slidably engage the upper flange of the oppositely disposed arms of the U-shaped frame B. The said flange is cutaway intermediate its ends at G and are so arranged that as the forward rollers of the auxiliary truck reach the limit of movement in engagement with the goose-necks D, the clips F will be in registration with said cutaway portions G thereby permitting the truck to be released. The clips F in addition to performing the function of locking the auxiliary truck in lowered position relative to the main truck also constitute guides loosely engaging over oppositely disposed guides H of a platform or table I. These guides H are preferably constructed of bars substantially T-shaped in cross section and have at their rear ends downwardly projecting goose-neck extensions H' constructed and arranged to engage over the rear rollers of the auxiliary truck and thereby limit the sliding movement of the table I relative thereto. This table I may be of any desired construction and extends beyond the goose-necks H in order that it may, when in lowered and innermost position, rest upon the top of the brace members C and C'. Any suitable means may be provided for retaining the table and truck in normal position. In the instance illustrated this means includes a projection K on the platform I extending through an aperture in the bar C' and engaged by a catch L pivoted to the said bar and arranged at its free end to pass through an opening in the projection K. Lugs h mounted upon the guide bars H are constructed and arranged to contact with the locking members F when the table is moved inward, thereby insuring the return with the table of the auxiliary truck.

From the above description, it is believed the operation is obvious. The parts being in normal position, when the latch L is released the auxiliary truck with the loaded table or platform will automatically roll forward and downward into dumping position. It is impossible for the table to tilt until the rollers of said auxiliary truck are engaged by the goose-necks D and H' of the main truck and table respectively. While the auxiliary truck is moving from the loading to dumping position, the loaded table moves double this distance and as the forward rollers of the auxiliary truck engage with the goose-necks D of the main frame and the goose-necks h' of the table engage with the rear rollers of the auxiliary truck, the locking device F has reached its releasing position; the center of gravity now having passed the front rollers, the locking members F pass through the cutaway portions G of the main truck and the truck with the superimposed table tilt automatically, and dump the load to the side of the car.

What I claim is:

1. In a dumping car or wagon the combination of a main truck, an auxiliary truck movable thereon, and a table carried by the auxiliary truck and independently movable relative thereto, and means for attaching the auxiliary truck to the main truck during a portion of its movement relative thereto.

2. In a dumping car or wagon, the combination of a main truck, an auxiliary truck slidably mounted thereon and arranged to tilt, and a table carried by and tiltable with said auxiliary truck and having an independent slidable movement relative thereto.

3. In a dumping car or wagon, the combination of a main truck having oppositely disposed tracks or guideways with goose-neck terminals, a table having downwardly extending goose-neck projections, a truck on which the table is slidably mounted, the truck having front and rear rollers adapted to be engaged respectively by the goose-neck projections on the table and tracks, and means for holding the truck in lowered position on said tracks during its movement along the same.

4. In a dumping car or wagon, the combination of a main truck having thereon a track or guideway with a flange at its top, an auxiliary truck slidably mounted on said track and adapted to be tilted relative thereto and means for normally holding the auxiliary truck in lowered position relative to the main truck comprising a clip engaging over said flange.

5. In a dumping car or wagon, the combination of a main truck having thereon a track or guideway with a flange at its top, an auxiliary truck slidably mounted on said track and adapted to be tilted relative thereto and means for normally holding the auxiliary truck in lowered position relative to the main truck comprising a clip engaging over said flange, and means for releasing said clip.

6. In a dumping car or wagon the combination of a main truck having thereon a track or guideway with a flange at its top, an auxiliary truck slidably mounted on said track and adapted to be tilted relative thereto and means for normally holding the auxiliary truck in lowered position relative to the main truck comprising a clip engaging over said flange, the said flange being cut away intermediate its ends whereby the clip when in registration therewith may be released.

7. In a car or wagon dump, a main truck frame having oppositely disposed tracks of substantially T-shaped cross-section, the upper flanges being cut away at a point intermediate their ends, an auxiliary truck mounted upon said main truck for slidable and tiltable movement, and locking clips on said auxiliary truck arranged to engage said upper flanges of the truck and to be disengaged therefrom when in registration with said cutaway portions.

8. In a car or wagon dump, a main truck frame having oppositely disposed tracks of substantially T shaped cross section, the upper flanges being cut away at a point intermediate the ends of the track, an auxiliary truck mounted upon said main truck for slidable and tilting movement and having antifriction rollers engaging said tracks, and locking clips on said auxiliary truck arranged to engage said upper flanges of the tracks and become disengaged therefrom when in registration with said cutaway portions.

9. In a car or wagon dump, a main truck frame having oppositely disposed tracks of substantially T-shaped cross section, the upper flanges being cut away at a point intermediate the ends of the tracks, an auxiliary truck mounted upon said main truck for slidable and tilting movement, locking clips on said auxiliary truck arranged to engage said upper flanges of the tracks and become disengaged therefrom when in registration with said cutaway portion, and a table mounted on the auxiliary truck for slidable movement.

10. In a car or wagon dump a main truck frame having guideways thereon, of an auxiliary truck mounted upon the main truck for slidable and tilting movement and means for holding said auxiliary truck in the same parallel plane relative to the guideways during its travel along said guideways.

11. In a car or wagon dump the combination of a main truck of an auxiliary truck movably mounted on the main truck, a table, oppositely disposed T-shaped bars on the table and clips on said auxiliary truck loosely engaging over the lower flange of the T-shaped bars for slidably supporting the table on said truck.

12. In a car or wagon dump, the combination of a main truck having a substantially T-shaped track with the upper flange thereof cutaway intermediate its ends, a table having a substantially T-shaped bar connected thereto, an intermediate truck mounted upon said track for sliding movement, and a clip on said intermediate truck arranged to engage the upper flange of the track and to be released therefrom when in registration with the cutaway portion thereof, and said clip being also arranged and constructed to loosely engage over the lower flange of the T-shaped bar on the table, whereby the table is slidably supported on said intermediate truck.

13. In a car or wagon dump the combination of a main truck having a flanged track or guideway with the flange cutaway intermediate its ends, a table having a projecting flange thereon, an auxiliary truck mounted upon said guideway for sliding and tilting movement, and a clip on said auxiliary truck arranged to engage the flange of the guideway and to be released therefrom when in registration with the cutaway portion thereof, and also arranged and constructed to loosely engage over the projecting flange of the table, whereby the latter is slidably supported.

14. In a car or wagon dump, the combination of a main truck having a guideway thereon with a suitable flange, a table a projecting flange on the table an intermediate truck mounted upon said guideway, and having a clip common to and adapted to loosely engage both the flange of the guideway and table.

15. In a car or wagon dump, the combination of a main truck, comprising a substantially U-shaped member, and a connecting member each of said members being of substantially T-shaped cross section.

16. In a car or wagon dump, a truck frame comprising a bar of substantially U-shaped formation, a connecting bar, an angle brace bar connected at the bend thereof to the base of the U-shaped bar and having at its ends an offset portion corresponding to an offset portion at the ends of the connecting bar, means for securing said angle and connecting bars at said offset portions to the free ends of the U-shaped bar and roller bearings mounted on said frame.

17. In a dumping car or wagon the combination of an inclined track, a truck having a load support, mounted upon said track, means for holding the truck on said track during its travel down the same and means for automatically releasing the rear end of the truck when it reaches the limit of its downward movement whereby it will automatically tilt and dump the contents of the support.

18. In a dumping car or wagon, the combination of a track, a truck mounted on the track, and bodily movable relative thereto, means for holding the truck on said track during its travel along the same and means for automatically releasing the rear end of the truck when it reaches the limit of movement whereby it may automatically tilt to dumping position.

In testimony whereof I affix my signature in presence of two witnesses.

BERT LLOYD.

Witnesses:
W. B. MORGAN,
GRACE PARKER.